`3,435,897`
WELL TOOL WITH HYDRAULIC IMPEDANCE MECHANISM AND ROTARY BALL VALVE
Burchus Q. Barrington, Duncan, Okla., assignor to Halliburton Company, Duncan, Okla., a corporation of Delaware
Filed Dec. 23, 1966, Ser. No. 604,209
Int. Cl. E21b *43/12;* F16k *31/12, 31/46*
U.S. Cl. 166—226                          10 Claims

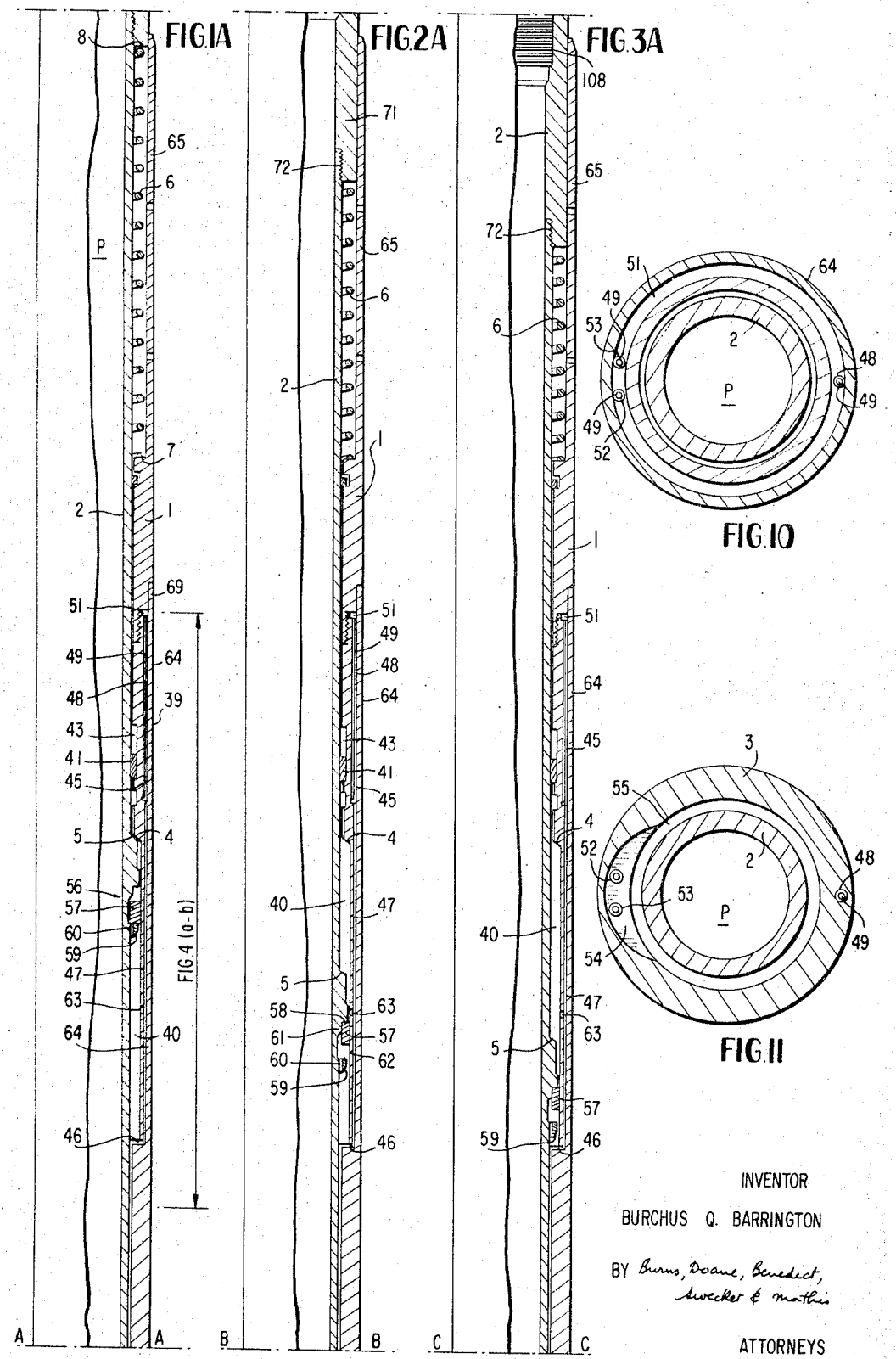

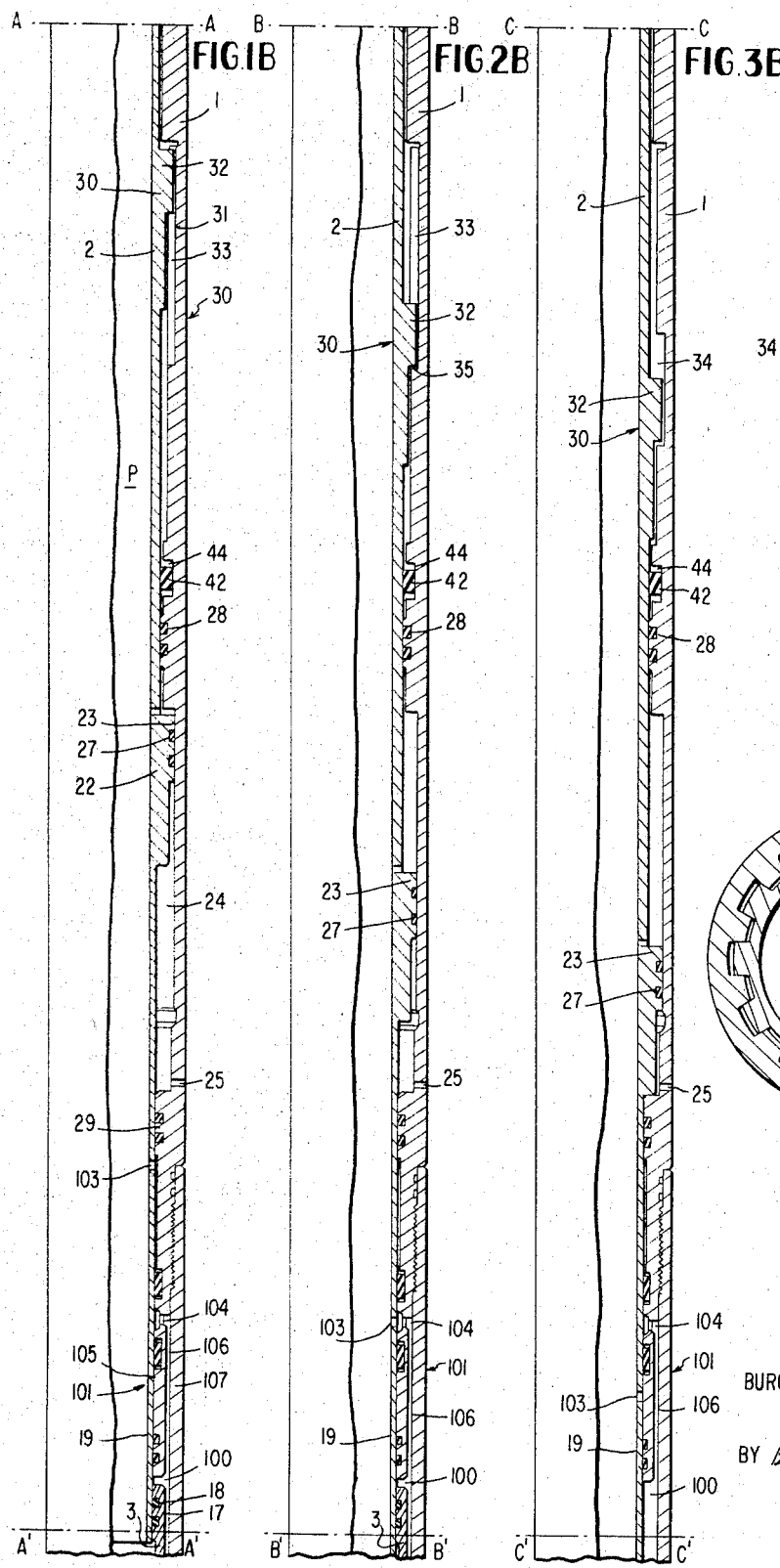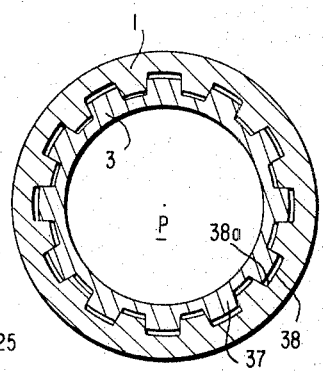

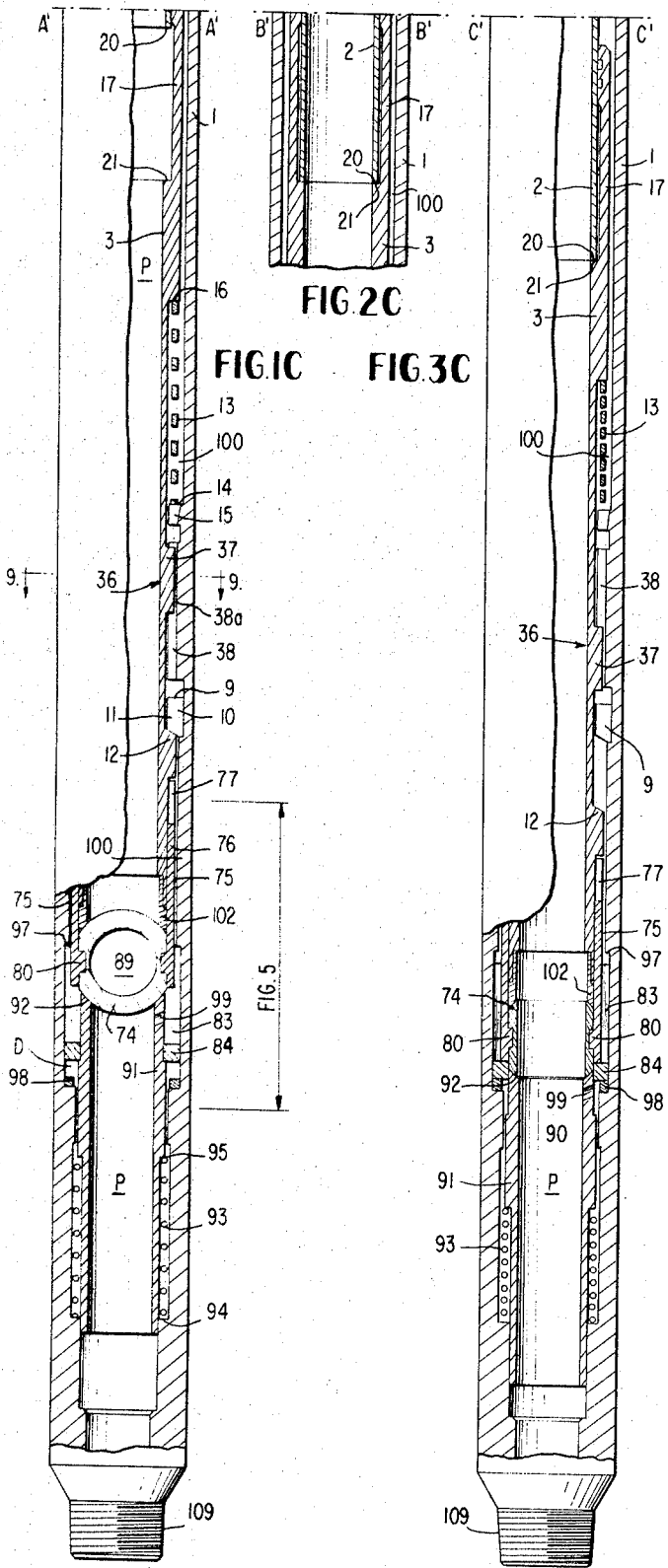
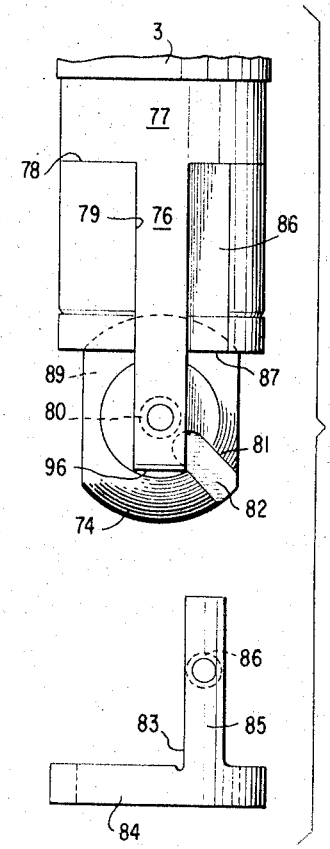

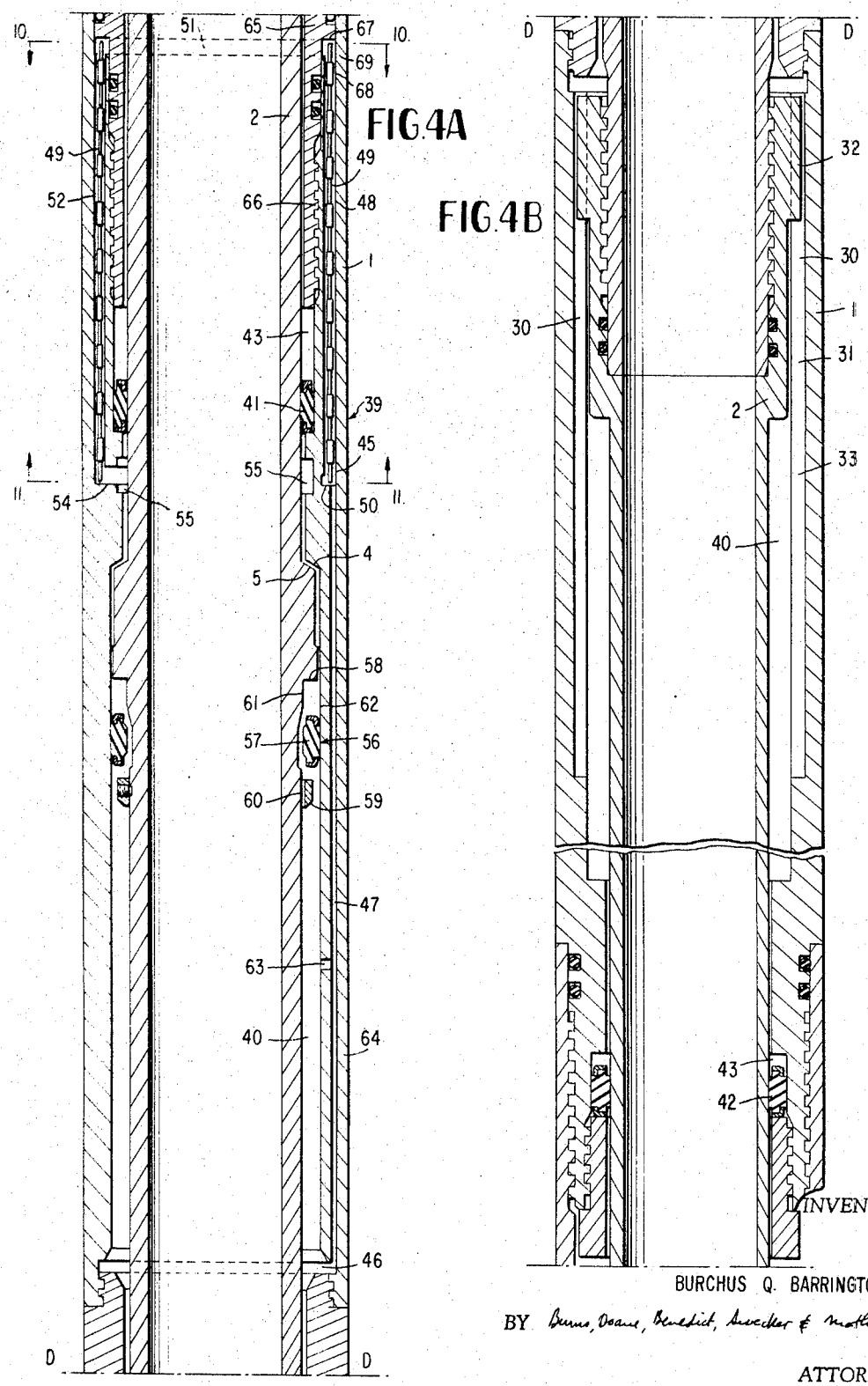

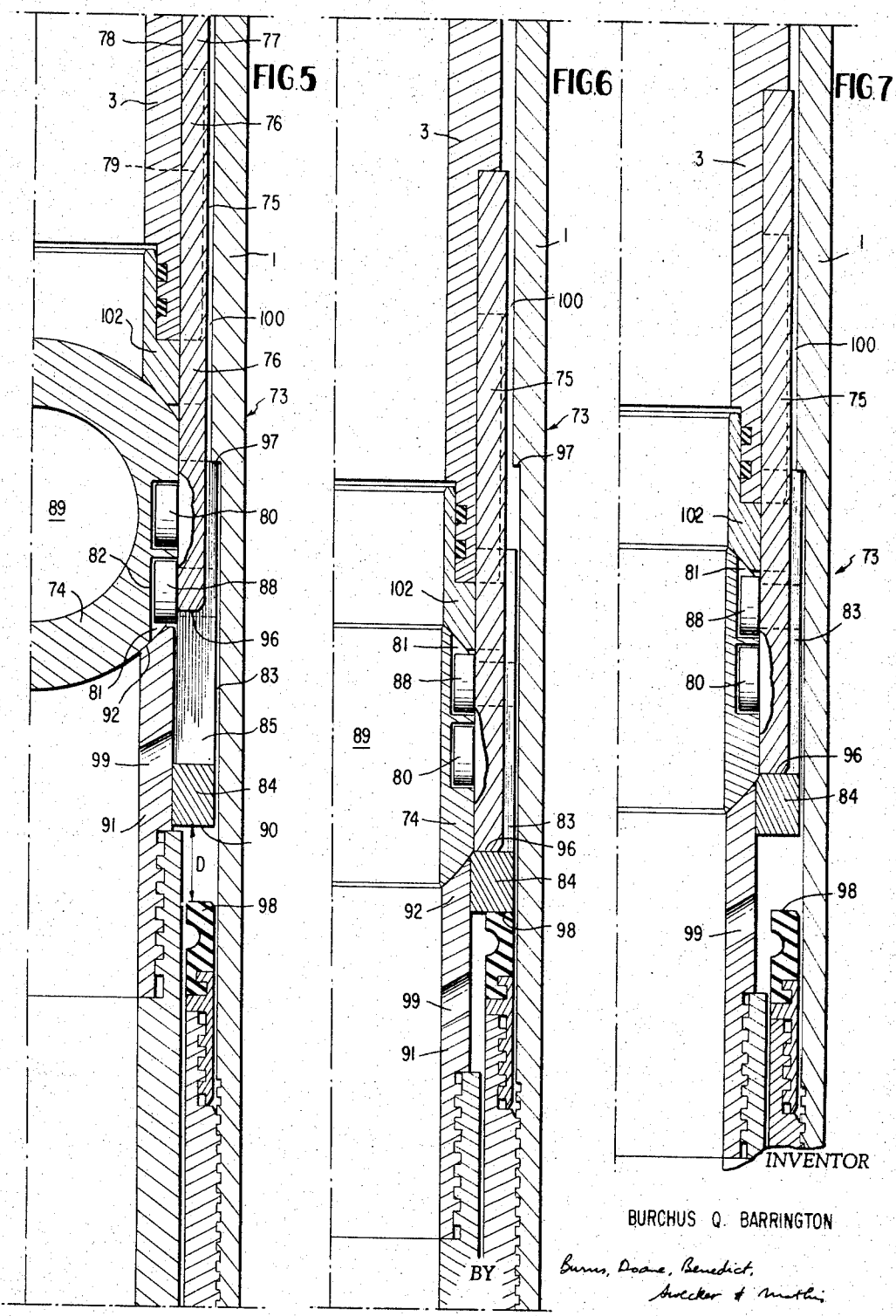

ABSTRACT OF THE DISCLOSURE

A well tool including a tubular body and two longitudinally displaced conduits mounted for individual telescoping movement therewithin. The lowermost inner tubular conduit supports a rotary valve. The uppermost tubular conduit, which serves to transmit actuating force to the rotary valve, is connected to the outer tubular members by an hydraulic coupling. This hydraulic coupling impedes, without preventing, movement of the valve actuating conduit. The two inner conduits are telescopingly interconnected and an annular bypass passage extends between the outer conduit and the telescopingly inter-connected inner conduits. A slide valve defined by portions of the outer conduit and the valve actuating conduit serves to control fluid flow through this bypass passage. A lug and slot control mechanism is provided to control movement of the valve actuating conduit relative to the outer conduit to insure that either the bypass valve or the rotary valve is placed in an open position in response to movement of the actuating conduit.

*Summary of invention*

A variety of well tools have been developed including valve mechanisms for controlling fluid flow through their interior. Often the operation of these valve mechanisms has depended upon relative telescoping movement of tool components. However, it is often necessary to be able to transmit axial force through the telescopable components prior to the operation of their associated valve mechanisms. To this end, hydraulic movement impeding mechanisms such as that described in U.S. Schwegman Patent 2,740,479 have been devised.

It has also been found desirable in many instances to provide a valving mechanism which provides a flow passage of maximum diameter through the tool. A particularly effective structure of this nature involves a rotary valve mechanism described in my co-pending application Ser. No. 509,487, filed Nov. 24, 1965, now Patent No. 3,347,318.

The movement control advantages resulting from the structure featured in the aforesaid Schwegman patent and the virtually full-bore capacity provided by the rotary valve featured in my aforesaid pending application are each features which are desirable for incorporation in a single well tool.

In this connection, it would be desirable to provide a mechanism for controlling flow through a well bore including a high capacity rotary valve in conjunction with a bypass passage of lesser capacity. Such a bypass passage would provide a flow path around the rotary valve having lesser capacity than the open valve. Such a low capacity flow path is desirable for producing a relatively slow flow of fluid from a formation into a well tool and thereby avoiding formation erosion which would result from a high volume flow.

The bypass passage, in addition to affording a flow path through the tool of limited capacity, would serve to equalize pressures on opposite sides of the rotary valve. This pressure equalization would serve to eliminate or minimize hydraulic forces acting on the rotary valve, as a result of the pressure differential across it. These forces would tend to impede valve movement or press movable valve seats so firmly against a valve body as to cause scoring of the seat or body as the valve body was rotated.

In the context of these desirable features, it would also be desirable to provide a control mechanism to enable an operator at a well head, with positive assurance, to be able to manipulate tool components so as to selectively open either the rotary valve or the bypass valve.

Through this invention, an apparatus is provided which affords these principal advantages as well as other desirable attributes.

The apparatus is characterized by body means having main passage means extending therethrough with valve means controlling this main passage means. Bypass passage means communicate with the main passage means on opposite sides of the valve means. Bypass valve means are provided for controlling flow through the bypass passage means. Operating means are provided for opening the bypass valve means prior to the opening of the main valve means.

Another significant facet of the apparatus of this invention entails an improved, hydraulic, movement impeding mechanism. This mechanism is characterized by unique accessibility to components likely to require servicing. This movement impeding mechanism includes first conduit means and second means telescopingly mounted within the first conduit means. A fluid reservoir means is disposed between the first conduit means and the second means. A restricted passage means is carried by the first conduit means. A check valve means is carried by the second means within the reservoir means. First and second seal means are longitudinally spaced from opposite ends of the check valve means, carried by one of the first conduit means and second means and enclose opposite longitudinal ends of the reservoir means. A third seal means is carried by the second means, is movable with the second means, and extends from the second means into slide engagement with the first conduit means. The third seal means is disposed within the reservoir means between an inlet and outlet of the restricted passage means. The inlet to, and an outlet from, the restricted passage means each communicate with the reservoir means between the first and second seal means, with the inlet and outlet being spaced from opposite ends of the third seal means. The check valve means is carried by the third seal means and disposed longitudinally between the inlet and outlet of the restricted passage means.

Other independently significant aspects of the apparatus pertain to the unique structure of a rotary valve. This rotary valve is characterized by valve mounting means positioned for telescoping movement within conduit means, with a rotary valve being rotatably mounted on the mounting means. A slide means is mounted for sliding movement relative to the mounting means. A cam means carried by the slide means is cammingly engaged with the rotary valve to effect its rotation in response to telescoping movement of the slide means on the mounting means. First and second abutment means carried by the conduit means are longitudinally spaced within the conduit means engageable with oppositely facing portions of the slide means.

Other significant facets of the invention resides in the combination of the aforesaid improved hydraulic coupling in conjunction with a J-slot and in the combination of the hydraulic impedance coupling with a rotary valve.

Still further independently significant facets of the invention reside in the incorporation in a well tool of a slide valve which controls fluid flow through a bypass passage which circumvents and provides fluid communication on opposite sides of a movable tool component.

Maximum advantages of the invention are derived from the interacting combination of all of these structural aspects of the invention.

In describing the invention, reference will be made to a preferred embodiment as shown in the appended drawings:

FIGURES 1A, 1B and 1C, when joined along the illustrated section lines A—A and A'—A', provide a partially sectioned longitudinal view of the apparatus of this invention, illustrating the disposition of its components as it is being lowered into a well bore with the rotary valve closed and the bypass passage closed;

FIGURES 2A, 2B and 2C, when joined along the section lines B—B and B'—B', provide a partially sectioned longitudinal view of portions of the apparatus shown in FIGURES 1A, 1B and 1C, illustrating the disposition of tool elements with the bypass passage open and the rotary valve closed;

FIGURES 3A, 3B and 3C provide a partially sectioned, longitudinal view of the tool shown in FIGURES 1A, 1B and 1C, illustrating the disposition of tool elements with the bypass valve closed and the rotary valve open;

FIGURES 4A and 4B, when joined along the section line D—D provide an enlarged sectional view of an hydraulic impedance coupling incorporated in the tool, with FIGURES 4A and 4B corresponding to the portion of the labeled "FIG. 4A–B" in FIGURE 1B;

FIGURE 5 provides an enlarged view of the rotary valve of the apparatus, disposed as shown in FIGURE 1C, with FIGURE 5 corresponding to the longitudinal portion of FIGURE 1C identified with the legend FIGURE 5;

FIGURE 6 provides an enlarged view of the rotary valve component of the apparatus in its open condition, with FIGURE 6 corresponding to the longitudinal portion of FIGURE 3 identified with the legend FIGURE 6;

FIGURE 7 provides an enlarged view of the rotary valve of the apparatus illustrating the disposition of its components while the rotary valve is still in a full open position but after a rotary valve actuating member has undergone limited, nonactuating, movement within the outer casing of the apparatus as permitted by a lug and slot device associated with the movement impedance mechanism of the apparatus;

FIGURE 8 schematically illustrates the relative positions of lug and slot components of the J-slot included in the apparatus;

FIGURE 9 provides an enlarged sectional view of a spline and groove connection between two telescoping portions of the apparatus as viewed along section line 9—9 of FIGURE 4B;

FIGURE 10 provides a transverse sectional view of an interconnecting passage portion of restricted passage means of the hydraulic impedance mechanism of the apparatus as viewed along the section line 10—10 of FIGURE 4A;

FIGURE 11 provides an enlarged cross sectional view of the hydraulic impedance mechanism of the apparatus, illustrating structural details of the outlet of its restricted passageway; and FIGURE 12 provides an enlarged elevational view of separated components of the rotary valve shown in FIGURE 1C.

Body portions of apparatus

As shown in FIGURES 1A, 1B and 1C, the apparatus of this invention includes a generally tubular, outer body 1. As illustrated, tubular body 1 may be comprised of a plurality of threadably interconnected segments.

Telescopingly disposed within tubular body 1 are longitudinally displaced, tubular bodies 2 and 3. Tubular body 2 is telescopingly disposed within an upper portion of tubular body 1, when the apparatus is disposed within a well bore. Tubular body 3 is disposed for telescoping movement within tubular body 1 and is disposed generally beneath tubular body 2 when the apparatus is within a well bore.

As will be appreciated, tubular body members 1, 2 and 3 may be viewed, respectively, as comprising outer conduit means 1 telescopingly housing inner, first and second, conduit means 2 and 3. Each of these conduit means is generally cylindrical in character and may be fabricated of threadedly connected segments.

As shown near the lower end of FIGURE 1B, the lower end of second conduit means 2 is telescopingly and sealingly received within the upper end of conduit means 3.

Tubular body portion 1 includes a generally inwardly extending, frustoconical, and downwardly facing, abutment 4. Second conduit means 2 carries on its outer periphery a generally upwardly facing, frustoconical, abutment means 5 disposed beneath and facing abutment means 4. Abutment means 4 and 5 are designed to be engageable, as shown in FIGURE 1A, so as to limit upward movement of conduit means 2 within conduit means 1 and enable the weight of conduit means 1 and conduit means 3 to be carried by conduit means 2 as the tool is being inserted into or withdrawn from a well bore. A coil spring 6 extending between an upwardly facing abutment 7 formed on the interior of conduit 1 and a downwardly facing abutment 8 formed in the exterior of conduit 2 serves to resiliently urge conduit means 2 upwardly relative to conduit means 1 so as to tend to hold the abutments 4 and 5 in engagement as shown in FIGURE 1A.

Outer conduit means 1 additionally includes a downwardly facing, vertically slotted, generally annular abutment means 9. Abutment means 9 may be fabricated by providing a plurality of longitudinally extending slots 10 in a generally annular rim 11 projecting radially inwardly from the interior of the conduit means 1 toward conduit means 3. Conduit means 3 carries a generally upwardly facing and frustoconical abutment means 12 which faces and is engageable with abutment means 9 and is radially spaced from conduit means 1.

Conduit means 3 is urged resiliently upwardly by a conventional coil spring 13, so as to yieldably maintain the abutment means 12 in engagement with the abutment means 9. As illustrated, coil spring 13 is supported at its lower end on an annular rim or abutment 14. As illustrated in FIGURE 1C, abutment 14, like abutment body 9, is provided with a plurality of longitudinal slots 15 extending therethrough. The upper end of spring 13 is engaged by an annular and downwardly facing rim or shoulder 16. Thus, the coil spring 13 tends to resiliently resist downward movement of the third conduit means 3 and tends to yieldably maintain conduit means 3 in its uppermost position, as defined by engagement of the abutments 9 and 12.

The uppermost end 17 of conduit means 3 may be provided with a plurality of O-ring type gaskets 18 which are disposed in slidable and sealing engagement with the outer periphery of the lower end 19 of the second conduit means 2. As shown in FIGURE 1C, the lowermost extremity 20 of conduit means 2 defines an annular abutment which is superposed above and faces an annular rim 21. Rim 21 projects radially inwardly from the interior of the upper end 17 of conduit means 3. With conduits 2 and 3 resiliently supported by springs 6 and 13 in the positions shown in FIGURES 1A, 1B and 1C, the abutments 20 and 21 are maintained in longitudinally spaced relation. With this spaced abutment relation, the conduit means 2 is free to undergo telescoping movement within the conduit means 1 without inducing downward telescoping movement of the conduit means 3 within the conduit means 1 until the abutment faces 20 and 21 are brought into engagement. With the faces 20 and 21 engaged, downward movement of the conduit means 2 will induce corresponding downward movement of the conduit means 3.

Upward or restoring movement of the conduit means 2 may be facilitated by a balancing piston 22. As shown in FIGURE 1B, balancing piston 22 comprises an annular piston 23 projecting radially outwardly from the outer periphery of conduit means 2 into an annular, cylinder-like recess 24. The annular fluid reaction area of the annular piston 23, which is exposed to well annulus pressure through port means 25 communicating with the cylinder chamber 24, serves to materially aid in restoring the cylinder means 2 to its upper position after it has been depressed within the conduit means 1.

While port means 26 may provide fluid communication between the interior of the conduit means 2 and the upper end of the piston 23 within the cylinder space 24, the pressure balancing effect provided by the fluid reaction surface on the lower end of the piston 23 will not be vitiated. The net fluid reaction surface of the upper end of the piston 23 is dimensioned such that the net annular area bounded by piston seal means 27 and cylinder seal means 28 is less than the net annular area between the diameters of piston seal 27 and cylinder seal 29. In thus providing a greater fluid reactive area exposed to fluids beneath the pistons 23, a net lifting force would be expected to be exerted on the conduit means by the balancing piston 27. Further, the hydrostatic pressure of fluids within a well annulus acting on the underside of the piston 23 would normally be expected to exceed the pressure of fluid within the apparatus 1 adjacent the port 26.

Relative movement of conduit means 2 within conduit means 1 is regulated by a pair of circumferentially spaced lug and slot control means 30. Each such control means 30, as shown in FIGURE 4B, may comprise an inwardly facing slot 31 carried by the conduit means 1 and a radially outwardly projecting lug 32 carried by the conduit means 2. As shown in FIGURES 1B and 8, lug 32 is slidably received within the slot 31. Slot 31 includes a first, generally longitudinally extending portion 33 and a generally transversely and downwardly inclined portion 34 which commuicates with the lower end of the slot portion 33. An abutment 35 at the lower end of slot portion 33 serves to limit downward movement of lug 32 when the lug 32 is disposed within the slot portion 33. When the conduit means 2 is lowered and rotated clockwise, the lug 32 will move through at least a portion of the longitudinal slot portion 33 and further downwardly into the slot portion 34.

Thus, while a counterclockwise torque is imposed on the conduit means 2 and its associated lug 32, movement of the lug 32 will be restricted to the relatively short travel path 33. While clockwise force is being exerted on the conduit means 2, the lug 32 may move through an extended longitudinal travel path.

Conduit means 3 is connected with conduit means 1 for linear but nonrotational movement by spline connection 36. As show in FIGURES 1C and 9, spline connection 36 comprises a plurality of radiating splines 37 carried by conduit means 3 and projecting radially outwardly into slidable engagement with slots or longitudinally extending grooves 38. As shown, grooves 38 are formed on the interior of conduit means 1. Each spline 37 terminates short of the radially outermost wall of its associated slot 38 so as to provide a clearance passage 38a.

As illustrated, telescopingly interconnected conduit means 2 and 3 provide a central flow passage P extending coaxially of the apparatus and first conduit means 1. In this connection, it is contemplated that each of the conduit means 1, 2 and 3, as in the case of ordinary well tools, will be predominantly circular in cross sectional configuration such that the central flow passage P is of circular and generally uniform cross section.

*Hydraulic impedance mechanism*

FIGURES 1A, 4A, 4B, 10 and 11 illustrate structural details of an hydraulic impedance mechanism 39 which is interposed between conduit means 1 and conduit means 2.

Impedance mechanism 39 includes a generally annular reservoir means 40 disposed radially between conduit means 1 and conduit means 2. The upper and lower ends of reservoir 40 are defined by annular and conventional gaskets or seals 41 and 42. Each of the seals 41 and 42, as illustrated, may comprise a movable or floating seal carried by the inner periphery of the conduit means 1. Thus, upper seal 41 is disposed for limited floating movement within an annular recess 43 while lower seal 42 is disposed for limited floating movement within an annular recess 44. Such floating seals are known in the well tool art and advantageously tend to equalize fluid pressures across themselves so as to prolong seal life.

Restricted passage means 45 is formed in the wall of conduit means 1. Restricted passage means 45 includes an annular inlet 46 communicating with a bore-like unobstructed passage portion 47 which extends upwardly to and communicates with a bore-like, pin receiving, restricted passage portion 48. Pin receiving, bore-like, passage 48 contains a metering pin 49 substantially as described in the United States Schwegman Patent 2,740,-479. Pin receiving passage 48 includes a lower ledge 50 which serves as an abutment to support the lower end of the metering pin 49. Metering pin 49, as described in the aforesaid Schwegman patent, is provided with alternating enlarged and recessed sections which, in cooperation with the wall of the bore-like passage portion 48, define a restricted fluid passageway. As shown in FIGURES 4A and 10, an annular and circumferentially extending, connecting passage 51 communicates with the upper end of pin housing passage 48. A pair of generally parallel, second and third pin receiving passages 52 and 53 are disposed generally diametrically opposite pin passage 48 and extend downwardly from connecting circumferential passage portion 51.

Each of pin passages 52 and 53 houses a metering pin identical to metering pin 49. Each of these metering pins is supported at its lower end on a recess ledge 54 extending radially outwardly from an annular groove or recess 55 which itself extends radially outwardly from the inner periphery of the conduit means 1, as shown in FIGURES 11 and 4A.

Annular recess 55 comprises an outlet of a restricted passage means comprising passage portions 47, 48, 50, 52 and 53. As noted, the inlet of this restricted passage is provided by annular opening 46.

As shown in FIGURES 1A and 4A, the pin receiving passage portions of the restricted passageway 45 are longitudinally displaced above fluid reservoir means 40, the upper and lower ends of which are defined by annular seals 41 and 42, respectively. This reservoir 40 which is annular in character and disposed radially between conduit means 1 and 2, is substantially fully filled with hydraulic fluid such as silicone oil.

A combination annular check valve and seal 56 is carried by conduit means 2 within reservoir 40 and disposed between restricted passage means inlet 46 and restricted passage means outlet 55. This combination check valve and third annular seal of impedance mechanism 39 comprises a conventional annular gasket 57 disposed for sliding movement between annular shoulder 58 and annular seat 59. Annular seat 59 may be provided with a plurality of longitudinally extending ports 60 disposed radially inwardly of gasket 57 when gasket 57 is engaged with seat 59. Seal 57 is dimensioned so that when engaged with annular seat 58, it is slidably and sealingly engaged with radially spaced surfaces 61 and 62 of conduit means 2 and conduit means 1 respectively. Surface 62 is smooth and continuously cylindrical throughout the travel path of gasket 57.

As will be appreciated, with this arrangement, when the conduit means 2 is moved downwardly, the seat 57 is forced into sealing engagement with the surfaces 61 and 62. Seal 57 then acts to displace fluid within the reservoir 40 into the restricted passage means inlet 46 so that it moves through restriced passage means 45 from beneath to above the seal 57. The passage of fluid through the restricted passage means is substantially retarded by the metering pins within the pin receiving passages 48, 52 and 53. Because of this restriction to fluid flow, downward movement of the conduit means is substantially impeded or slowed.

Relatively unrestricted bore-like portion 47 of the restricted passage means is provided with an intermediate bypass port 63 that provides radial fluid communication between the main reservoir means 40 and the intermediate portion of the bore-like passage 47. With this bypass port arrangement, when the seal 57 has moved downwardly past this port 63, the fluid being displaced by the downwardly moving seal 57 will enter the port 46, move upwardly to the port 63 and re-enter the main body of the reservoir 40 without flowing through the pin-receiving passages 48, 52 and 53. Thus, when the annular seal means 57 has cleared the bypass port 63, the movement impedance effect of the mechanism 39 is substantially reduced so that the conduit means 2 will undergo appreciably more rapid movement for the remainder of its downward travel.

During upward or restoring movement of the conduit m•ans 2, the annular seal means 57 is seated on the annular and longitudinally ported abutment 59. During upward movement of the conduit means 57, fluid may bypass the seal means 57 by flowing through the seat ports 60 so as to facilitate rapid upward or restoring movement of the conduit means 2.

This basic mode of operation of an hydraulic impedance device is analogous to that described in the aforesaid Schwegman Patent 2,740,479. However, it will be appreciated that the present apparatus is significantly different from that featured in the Schwegman patent in that the metering pin passages are carried by the outer conduit housing of the tool and at least partially longitudinally displaced from the main fluid reservoir 56. This structure is especially significant in that it enables direct access to the metering pins within the passages 48, 52 and 53 without disturbing the reservoir means 40 which is filled with costly hydraulic fluid such as silicone oil.

Thus, conduit means 1 includes a generally cylindrical segment 64 housing the pin passages 48, 52 and 53. A superposed conduit means segment 65 is connected by threaded coupling means 66 to segment 64. Conduit means segment 65 includes a radially extending wall 67 which, when segments 64 and 65 are threadedly engaged, defines the upper wall of connecting, circumferential passage portion 51. The outer wall 68 of connecting passage 51 is defined by a smooth cylindrical extension 69 of segment 64. This segment projects into telescoping and sealing engagement with the outer periphery of cylindrical wall portion 70 of segment 65.

Turning to FIGURE 2A, it will be seen that the upper portion 71 of conduit means 2, which portion carries shoulder 8, may be threadedly disengaged at coupling 72 from the conduit means 2. With this segment 71 disengaged from the conduit means 2, the spring 6 may be removed and the segment 65 then threadedly disengaged from the segment 64 so as to provide direct access to the metering pins contained within the passages 48, 52 and 53. Thus these metering pins may be serviced or replaced as desired without disassembling the tool components defining the reservoir means 40.

Rotary valve mechanism

FIGURES 1C, 5, 6, 7 and 12 illustrate a rotary valve mechanism 73 disposed at the lower end of third conduit means 3 to control fluid flow through the main or central passage P of the apparatus.

Rotary valve mecahnism 73 includes a rotary, ball valve 74 mounted on the lower end of conduit means 3 by a mounting arrangement substantially the same as that described in my copending United States application Ser. No. 509,487, filed Nov. 24, 1965, now Patent No. 3,347,-318. This ball valve mounting arrangement is characterized by a pair of mounting brackets. Each mounting bracket is identical such that only one will be described in relation to the present apparatus. This bracket to be described, as shown in FIGURES 12 and 5, comprises a bracket 75 including a longitudinally extending arm portion 76 and a semicylindrical base portion 77. Base portion 77 is snugly received in a circumferential recess 78 formed in a lower portion of conduit means 3 while arm portion 76 is snugly received within a longitudinally extending groove 79 extending from the circumferential recess 78. Movement of bracket 75 laterally outwardly of recess 78 and groove 79 is prevented by the closely radially adjacent inner periphery of the conduit means 1. Bracket 75 at its lower end supports a stub axle 80 which pivotally supports one side of the rotary valve 74 for rotation about an axis perpendicular to, and intersecting, the longitudinal center line of the apparatus. The two brackets supporting valve 74 are disposed in a mirror image relation on opposite sides of conduit means 3 and valve 74.

Valve 74 includes a pair of parallel camming grooves 81 disposed on each of the opposite sides. These camming grooves, as described in my copending application Ser. No. 509,487, extend inwardly of the outer periphery of the valve body and generally radially of the pivot axis of the valve body. The base portion 82 of each groove 81 extends parallel to the central axis of the apparatus.

A slide member 83 is connected with the valve 74 and disposed for sliding movement relative to the conduit means 3. Slide member 83 includes a generally cylindrical or ring-like base 84 and a pair of longitudinally extending arms 85. Each arm 85 is mounted on the ring 84 so as to be circumferentially offset, but substantially adjacent, an arm portion 76 of a valve-mounting bracket 75. Each arm portion 85 has a peripheral curvature defining a longitudinal continuation of the curvature of the outer periphery of the portion of the base 84 from which it extends. Each such transversely curved arm 85 is adapted to be slidably received within a longitudinally extending groove 86 extending from the lowermost end 87 of the conduit means 3. Each arm 85 of the slide member 83 supports a disc-like, cam pin 88 which projects transversely inwardly into one of the camming grooves 81.

With this arrangement, as the slide member 83 undergoes converging sliding movement with the conduit means 3, the camming pins 88 of the slide member will coact with the camming grooves 82 of the ball valve 74 and induce rotation of the ball valve.

With the cylindrical bore 89 of valve body 74 extending perpendicular of the passage P so as to close the passage P, as shown in FIGURES 1C and 5, the slide 83 is in its position of maximum extension in relation to conduit means 3. Slide member 83 is prevented from moving downwardly out of its position of maximum extension in relation to conduit means 3 and out of camming engagement with ball valve 74 by an annular rim 90 which is adapted to limit downward movement of the slide 3 by engaging the underside of the ring 84. Annular rim 90 projects radially outwardly from a generally tubular or conduit like member 91. This member 91 provides a valve seat 92 engaging the underside of the rotary valve member 74, substantially as shown in FIGURES 1C and 5. Valve seat defining member 91 is slidably disposed within the lower end of conduit means 1 and biased resiliently upwardly into frictional and yieldably cvompressive engagement with the underside of the ball valve body 74 by a coil spring 93.

As shown in FIGURE 1C, coil spring 93 is supported at its lower end by an upwardly facing annular shoulder 94 extending radially outwardly from the inner periphery of the conduit means 1. Spring 93 at its upper end, biasingly engages and urges upward a downwardly facing shoulder 95 projecting radially outwardly from a portion of the outer periphery of the member 91.

Converging movement of the slide 83 relative to the conduit means 3 is limited by engagement of the upper end of the base 84 of the slide member 83 with the lower end 96 of the arm portion 75 of the ball valve bracket 73.

As shown in FIGURES 1C and 5, slide member 83 is restrained for sliding movement within conduit means 1 through a longitudinal path defined by an uppermost and downwardly facing annular abutment 97 and a lowermost and upwardly facing annular abutment 98. Abutment 97 extends radially outwardly from an inner periphery of conduit means 1. Annular abutment 98 may comprise an annular elastomeric member serving as a shock absorbing type of lower abutment. As shown, annular abutment 97 is positioned so as to engage the upper end of arms 85 while abutment 98 is positioned to engage the underside of base 84 of slide member 83.

Abutments 97 and 98 are longitudinally spaced a distance exceeding the longitudinal distance between the upper end of arms 85 and the lower end of the ring or base member 84. Thus, with this arrangement, the conduit means 3 may be depressed downwardly for a distance equal to the distance D shown in FIGURE 5 before the slide member 83 commences rotary valve actuating convergence with the conduit means 3. This distance D represent the amount by which the longitudinal gap between abutments 97 and 98 exceeds the longitudinal gap between the upper end of the arms 97 and the lower end of the base 84.

Once downward movement of conduit means 3 has brought ring or base 84 into engagement with the shock absorbing abutment 98, the slide 83 commences converging engagement with the lower end of the conduit means 3 and the camming pins 88 cooperate with the ball valve grooves 82 to commence rotation of the rotary valve 74. This rotary movement continues until the upper end of the ring 84 engages the lower ends 96 of the valve mounting arms 76. A continued downward force exerted on the conduit means 3, after the ring 84 has engaged the arm ends 96, will induce resilient compression of the elastomeric abutment 98 so as to prevent damage to the valve components. As will be appreciated, the urging of the valve seat 92 into resiliently biased or compressive sliding engagement with the underside of the valve body 74 provides a stabilizing influence on the valve body 74. In other words, seat 92 functions as a frictional drag to maintain any position of the valve body 74 not overcome by abutment induced movement of the slide member 83.

*Bypass passage and bypass valve*

As shown in FIGURE 5, sleeve 91 in essence defines a continuation of central passage P. One or more transversely extending ports 99 in sleeve 91 provide communication between central passage P beneath valve body 74 and a generally annular bypass passage 100. Passage 100 extends upwardly from port 99 and is disposed radially between conduit means 1 and the portions of the outer peripheries of the telescopingly connected conduit means 2 and 3. Bypass passage 100 extends longitudinally along the sides of arms 75 and 85 where these arms project beneath the conduit means 3, extends about the outer periphery of the lower end of the conduit means 3, passes through slots 10, continues upwardly between conduit means 1 and 3, passes through slots 15, and communicates with a bypass, slide valve 101 shown in FIGURE 1B. In this connection, it will be appreciated that bypass passage 100 is effectively sealed from interior passage P by virtue of seat 92 of member 91 engaging the lower side of solid ball valve member 74 and a valve seat 102 carried at the lower extremity of conduit means 3 which engages the upper side of ball valve 74.

Bypass slide valve 101 comprises one or more ports 103 transversely intersecting conduit means 2. Slide valve 101 additionally includes one or more transversely extending ports 104 which are carried by a sleeve portion 105 of conduit means 1. As shown in FIGURE 1B, sleeve portion 105 is separated by an annular gap 106 from a radially displaced wall portion 107 of conduit means 1. Gap 106 defines a continuation of bypass passage means 100 and communicates with port means 104.

FIGURE 1 illustrates bypass slide valve 101 disposed in a closed position, i.e., with the ports 103 and 104 longitudinally displaced. When conduit means 2 is telescoped downwardly within conduit means 1 sufficient to radially align the ports 103 and 104, fluid communication is provided between the portion of central passage P beneath ball valve 74 and the portion of central passage P above ball valve 34, with this path of fluid communication including port means 99, bypass passage 100 and gap 106, and the aligned ports 103 and 104. Once the ports 103 and 104 have been brought into radial alignment, continued downward movement of conduit means 2 will displace port 103 longitudinally beneath ports 104 to again close the bypass passage means 100.

As will be appreciated, the flow capacity of bypass passage 100 is substantially less than the flow capacity of the substantially continuous, cylindrical central passage P when ball valve 74 is rotated to an open valve condition.

*Significant dimensional relationships*

Bypass port 63 is positioned so that the combination check valve and seal means 57 will clear the bypass port 63 during the downward travel of the conduit means 2 before the bypass slide valve 101 has been opened and before the second conduit means abutment 20 has been brought into engagement with third conduit means abutment 21 so as to induce rotary valve actuating movement of third conduit means 3. This, of course, means that the initial downward movement of conduit means 2 to initiate opening of the bypass valve means 101 will be impeded by mechanism 39 such that longitudinally directed force may be transmitted for a time increment through the entire apparatus without opening either the bypass valve 101 or the rotary valve mechanism 73. This arrangement of the bypass port 63 within the hydraulic impedance mechanism 39 also means that once the conduit means 2 commences to transmit motion to conduit means 3, the conduit means 2 may move without an hydraulic impedance effect so that opening of rotary valve mechanism 73 may be rapidly effected.

Longitudinal slot portion 33 of lug and slot control mechanism 31 is sufficiently short so as to prevent conduit means 2 from moving downwardly sufficient to transmit movement to conduit means 3. Thus, as shown in FIGURE 2C and FIGURE 8, when lug 32 has moved downwardly through slot portion 33 to engage abutment 35, abutment 20 has just been brought into engagement with abutment 21. With this disposition of tool elements, of course, rotary valve mechanism 73 remains closed. As will be appreciated, engagement of the lug 32 with the slot abutment 35 may provide an alignment mechanism to assure the radial alignment of bypass slide valve ports 103 and 104.

As has been previously noted, lug 32 may be maintained within the relatively short longitudinal travel path defined by leg 33 of slot 31 by placing a counterclockwise torque on conduit means 2.

As has also been noted earlier, if a clockwise torque is imposed on conduit means 2, lug 32 will move downwardly through slot 33 and translate laterally into the lower slot end 34. FIGURE 8 illustrates in phantom lines the disposition of the lug 32 when it is disposed in the lowermost end of slot portion 34.

The longitudinal distance between the position of the lug 32 on abutment 35 and the position of lug 32 at the lower end of slot portion 34 exceeds the longitudinal distance of conduit means 3 which is necessary to effect either full opening or full closing of valve body 74. However, this distance is such as to enable the ring portion 84 of slide member 83 to move downwardly through the gap D into engagement with the abutment 98 after which converging movement of slide member 83 relative to conduit means 3 will take place so as to induce rotation of valve 74 from a full closed to a full open position. The gap D, shown in FIGURE 5 between ring 84 and abutment 98, corresponds to the gap D shown in FIGURE 8 between the upper end of the lug 32 when it is disposed in slot portion 34 and the upper end of slot portion 34. This clearance in the lug and slot control mechanism is necessary to enable smooth transitional movement of the lug 32 from slot portion 33 to slot portion 34 while providing a configuration of slot portion 34 which will have flat, transversely extending, upper and lower walls to restrain the lug 32 against longitudinal movement.

As will be recognized, the conduit means 2 may move upwardly relative to conduit means 1 by a distance equal to gap D, as permitted by the space between the top of the lug 32 and the top of the slot portion 34 after conduit means 3 has been moved so as to induce opening of the valve body 74. However, because of the gap D, which in the open condition of valve mechanism 73, exists between abutment 97 and the tops of arms 85 as shown in FIGURE 6, the upward following movement of the conduit means 3 through the longitudinal distance D will take place without inducing rotation of the rotary valve body 74 out of its full open condition. As will be appreciated, as slide 83 moves longitudinally between abutments 97 and 98, the full open position of the rotary valve body 74 will be maintained by frictional and resiliently biased engagement of the valve seat 92 with the underside of the valve body 74.

*Overall operation of apparatus*

The apparatus of this invention, when used as a valve in a well testing operation, may be incorporated in a well string above a conventional circulating valve which in turn is disposed above a conventional packer.

Both the circulating valve and packer may be conventional well devices operated in response to well known linear and rotary manipulations of the well string. As will be recalled, linear force may be transmitted through the apparatus of this invention owing to the inclusion of the hydraulic impedance mechanism. Rotary force, of course, may be transmitted through the apparatus by virtue of the lug and slot connection 31 between first conduit means 1 and second conduit means 2 and the inclusion of the spline and groove connection between conduit means 1 and conduit means 3.

The packer in this installation may be of the conventional, drag spring operated, hook wall type.

It will be understood then that the apparatus shown in FIGURES 1A, 1B and 1C will be lowered into a well bore with the upper end of the apparatus connected to a well string extending upwardly to a well head and with the lower end connected with a packer assembly. Thus, as shown in FIGURE 3A, the upper end of the apparatus may be connected by conventional female coupling 108 to the lower end of the conduit string that extends to the well head while a conventional threaded male coupling 109 may serve to connect the tool with a packer and other apparatus disposed beneath it.

This arrangement, when the packer assembly is expanded into engagement with a well bore, anchors the lower end of the conduit means 1, i.e., immobilizes the conduit means 1 within a well bore. With the conduit means 1 thus immobilized, linear and rotary movements may be imparted through the well string to the conduit means 2 to selectively effect operations of the main rotary valve 73 and the bypass slide valve 101.

After the packer of the assembly has been set, it may be desired to open the slide valve 101 for a period of time before opening the main valve 73 to allow formation fluid to enter the apparatus for formation testing purposes, for example. In this event, a counterclockwise torque is imposed upon the conduit string and transmitted to the conduit means 2 concurrently with a downwardly imposed force. This will cause the conduit means 2 to move downwardly and align the ports 103 and 104 of the bypass slide valve 102 as shown in FIGURES 2A and 2B. The lug 32 of the lug and slot connection 31 will, in this position of the apparatus, have come to rest on the shoulder 35. Although the shoulders of abutments 20 and 21 may have been brought into near or actual engagement, the conduit means 2 will not have moved sufficiently to induce actual or meaningful movement of conduit means 3. Thus, the main valve 73 will remain closed.

The initial opening of the slide valve 101 may be advantageous in that it provides restricted fluid communication between the interior of the conduit string and a formation to be tested. Thus, rapid, flow-induced erosion of the formation may be imposed or prevented by choking the flow of formation fluid into the tool. As will be understood, a heavy initial flow from the formation into the tool may cause severe formation erosion.

After the interior passage P and a portion of the interior of the conduit string have filled with fluid so as to impose a back pressure on the formation being tested, it may then be deemed safe to open the main valve 73 so as to provide for less restricted flow into the tool, with this flow being controlled by the hydrostatic pressure of fluid which previously entered the tool interior. The opening of the main valve mechanism 73 is easily accomplished by imposing a downward force on the conduit means 2 concurrent with a clockwise torque. This is accomplished by imposing a clockwise torque and downward force on the supporting conduit string. This application of force will result in the lug 32 moving downwardly into the lower end of the slot portion 34 and moving the conduit means 3 downwardly sufficiently to cause opening of rotary valve mechanism 73. With rotary valve mechanism 73 open, the apparatus elements are disposed substantially as shown in FIGURES 3A, 3B, and 3C as well as FIGURE 6.

With the rotary or main valve mechanism 73 open, even if the conduit means 2 and 3 should move upwardly through the gap D as permitted by the longitudinal spacing between the lug 32 and the top and bottom of the slot portion 34, the rotary valve 74 will remain in a full open position with the bore 89 of the valve 74 coaxially aligned with the passage P so as to define substantially a smooth full bore continuation of the passage P. As will be recalled, this maintenance of the rotary valve position is permitted by the spacing between abutments 97 and 98, with the rotary valve 74 being held in secured position by the resiliently biased valve seat 92.

As will be appreciated, valve seat 92 will move linearly with valve 74 and remain in biasing contact with it as a consequence of the biasing of the coil spring 93. Thus, as shown in FIGURE 7, even though the conduit means 3 and valve 74 have moved upwardly, the valve 74 remains in its full open position.

To close the main valve mechanism 73 and the slide valve 101 it is merely necessary to raise the supporting conduit string while imposing a counterclockwise torque on it so as to restore the lug 32 to its uppermost position within the slot 32. During this upward movement, the hydraulic impedance mechanism will not resist movement of the conduit means 2.

During downward movement of the conduit means 2, the hydraulic impedance mechanism will impose a resisting force until the third seal means 57 clears the bypass port 63. This will occur just before the opening of slide valve 101. When the seal means 57 clears the bypass port 63, an operator at a well head will detect a substantial and abrupt decrease in the force required to move the conduit string downwardly and will thus be advised of the opening of the slide valve 101.

As will be appreciated, with this disposition of the bypass port 63 and seal 57, once the slide valve means 101 has been opened, the conduit means 2 may continue in its downward movement to effect opening of the rotary valve mechanism 73 without this movement being resisted by the hydraulic impedance of the mechanism 39.

*Summary of some principal advantages of invention and scope of invention*

A principal advantage of the invention resides in the provision of the selectively operable bypass or choke valve in combination with a substantially operable, main valve for controlling flow through a main passage of a well tool. This enables, while maintaining positive operational control, the inducing of restrictive flow into a tool, prior to full flow. With the dual valve arrangement, an operator is able to positively and easily obtain the desired flow conditions without guessing with respect to the setting of a single valve.

Another principal advantage resides in the improved structure of the hydraulic impedance mechanism which affords, with unique ease, access to elements of the impedance mechanism which may require service or replacement.

Another principal advantage resides in the novel structure of the rotary valve which enables the valve to remain stable even though its actuating components move through a distance permitted by the loose fit of the lug and slot of a J-slot type control mechanism.

Significantly, the bypass valve and main valve are sequentially operable in response to linear movements of a conduit string so as to ensure that the lesser capacity bypass passage is always opened before the main passage is opened. If it is desired to move substantially directly to the full main valve open condition, this may, in effect, be accomplished by continuing the downward movement of the conduit string so as not to permit the conduit string to come to rest in a position where the bypass valve would be open.

The overall structure of the apparatus, characterized by the three relatively telescopic conduit-like body components, in conjunction with the rotary valve, provide a well tool having a maximized central passage capable of handling maximum fluid flow and capable of transmitting well tools. The hydraulic impedance mechanism enables linear force to be transmitted through the tool for a limited period of time without opening either of the valve components of the tool. The combination of the hydraulic impedance mechanism and a J-slot type control device provides impedance to movement in conjunction with a controlled extent of linear movement of valve actuating components. This combination affords maximized control over the operation of the tool valves.

The telescopically related, inner conduits of the tool body effectively define an isolated bypass passage which is maintained even though these body portions undergo relative movement and movement relative to an outer housing.

The provision of a multivalve tool where the operation of a first valve is impeded but the operation of a second sequentially operated valve is not impeded provides a desirable control over the initiation of valving operations without impeding the overall sequence of valve opening. In a similar vein, the combination of a hydraulic movement impeding mechanism and the main rotary valve provides a desired time delay between the imposition of valve opening force and the opening of the rotary valve so as to effectively avoid accidental full opening of the main passage of the well tool.

Not to be overlooked is the inclusion in the tool of a pressure balancing piston which serves to facilitate the restoring of actuating elements to their initial position. The convenient inclusion of the pressure balancing piston arrangement is made possible through the utilization of tubular or conduit-like body portions.

As will be recognized, this tool is versatile in character. It may be conveniently employed in well testing operations as well as in operations involving the transmission of fluids through a conduit string to a formation zone.

In describing the invention, reference has been made to the preferred embodiment. However, those skilled in the art and familiar with the disclosure of this invention may well recognize additions, deletions, substitutions or other modifications which would fall within the purview of the invention.

I claim:

1. An apparatus for use in a well bore, said apparatus comprising:
   body means;
   passage means extending through said body means;
   control valve means controlling said passage means;
   bypass passage means communicating with said passage means on each of opposite sides of said valve means;
   bypass valve means for controlling flow through said bypass passage means;
   operating means for opening said bypass valve means prior to the opening of said control valve means; and
   hydraulic impedance means operable to hydraulically impede, without preventing, bypass valve actuating movement of said operating means;
   said passage means extending centrally and axially continuously through said control valve means and said hydraulic impedance means;
   said hydraulic impedance means including an hydraulic fluid chamber operable to impede movement of said operating means, said chamber being carried by said body means and displaced radially outwardly from said passage means and operating means;
   said passage means communicating with said by-pass passage means between said control valve means and said control valve means and said hydraulic impedance means in response to operation of said operating means; and
   said operating means being axially moveable, relative to said chamber, to induce operation of said bypass valve means.

2. The apparatus of claim 1:
   wherein said body beans comprises:
      a first outer conduit;
      a second conduit telescopingly mounted within said first conduit; and
      a third conduit telescopingly mounted within said first tubular member and telescopingly engaged with said second conduit;
   wherein said bypass passage means extends longitudinally of said first conduit, communicates with the interior of said third conduit, extends longitudinally of the outer peripheries of said third and second conduits, and communicates with the interior of said second conduit;
   wherein said bypass valve means comprises slide valve means carried by said first and second conduits and operable in response to relative telescoping movement of said second conduit within said first conduit; and
   wherein said passage means includes communicating interior portions of said second and third conduits.

3. An apparatus for use in a well bore, said apparatus comprising:
   first conduit means;
   second conduit means telescopingly mounted within said first conduit means;
   fluid reservoir means disposed between said first conduit means and said second conduit means;
   restricted passage means carried by said first conduit means;
   check valve means carried by said second conduit means within said reservoir means;
   first and second seal means longitudinally spaced from opposite ends of said check valve means, carried by one of said first conduit means and second conduit means and enclosing opposite longitudinal ends of said reservoir means;

third seal means carried by said second conduit means and moveable therewith and extending from said second conduit means into sliding engagement with said first conduit means within said reservoir means;

an inlet to said restricted passage means communicating with said reservoir means between said first and second seal means, said inlet being longitudinally spaced from one end of said third seal means;

an outlet from said restricted passage means communicating with said reservoir means, said outlet being longitudinally spaced from an end of said third seal means opposite to said one end thereof;

said check valve means being carried by said third seal means, with said third seal means and said check valve means being disposed longitudinally between said inlet and said outlet;

third conduit means telescopingly mounted within said first conduit means;

valve mounting means positioned for telescoping movement within said first conduit means and carried by said third conduit means;

a rotary valve rotatably mounted on said mounting means;

slide means mounted for sliding movement relative to said mounting means;

cam means carried by said slide means and cammingly engaged with said rotary valve to effect rotation thereof in response to telescoping movement of said slide means on said mounting means;

first and second abutment means carried by said first conduit means and longitudinally spaced therewithin with each of said abutment means being engageable with one end portion of said slide means;

passage means extending through said second and third conduit means;

said rotary valve being positioned to control flow through said passage means;

bypass passage means communicating with said passage means on each of opposite sides of said rotary valve;

bypass valve means for controlling flow through said bypass passage means; and means for opening said bypass valve means prior to the opening of said rotary valve.

4. An apparatus for use in a well bore and comprising:
conduit means;
first valve means for controlling flow through said conduit means;
second valve means for controlling flow through said conduit means;
valve actuating means movable longitudinally of said conduit means to sequentially actuate said first and second valve means;
hydraulic impedance means operable to impede, without preventing, longitudinal movement of said valve actuating means;
movement facilitating means to abruptly reduce the impedance of movement of said valve actuating means prior to the actuation of said second valve means;
central passage means extending centrally and axially continuously through said second valve means and said hydraulic impedance means, with flow through said central passage means being controlled by said second valve means;
said hydraulic impedance means including an hydraulic fluid chamber operable to impede movement of said valve actuating means, said chamber being carried by said conduit means and displaced radially outwardly from said central passage means and said valve actuating means; and
bypass passage means, bypassing said second valve means, and communicating with said central passage means between said second valve means and said hydraulic impedance means, with flow through said bypassing means being controlled by said first valve means;
said valve actuating means being axially moveable, relative to said chamber, to induce operation of said first and second valve means.

5. An apparatus as described in claim 4:
wherein said movement facilitating means is operable to reduce the impedance of movement of said valve actuating means prior to the actuation of said first and second valve means; and
wherein said apparatus includes movement control means to selectively limit movement of said valve actuating means to a travel path sufficient to operate said first valve means without operating said second valve means.

6. An apparatus for use in a well bore, said apparatus comprising:
body means;
passage means extending through said body means;
control valve means controlling said passage means;
bypass passage means communicating with said passage means on each of opposite sides of said valve means;
bypass valve means for controlling flow through said bypass passage means; and
operating means for opening said bypass valve means prior to the opening of said control valve means;
said body means including:
a first outer conduit,
a second conduit telescopingly mounted within said first conduit, and
a third conduit telescopingly mounted within said first tubular member and telescopingly engaged with said second conduit;
said bypass passage means extending longitudinally of said first conduit, communicating with the interior of said third conduit, extending longitudinally of the outer peripheries of said third and second conduits, and communicating with the interior of said second conduit;
said bypass valve means comprising slide valve means carried by said first and second conduits and operable in response to relative telescoping movement of said second conduit within said first conduit; and
said passage means including communicating interior portions of said second and third conduits;
said control means including:
valve mounting means carried by said third conduit;
a rotary valve rotatably mounted on said mounting means and positioned within said passage means;
slide means mounted for telescoping movement on said mounting means;
cam means carried by said slide means and cammingly engaged with said rotary valve to effect rotation thereof in response to telescoping movement of said slide means on said mounting means;
first and second abutment means carried by said first conduit and longitudinally spaced and disposed on opposite sides of said slide means, with each of said abutment means being engageable with one end of said slide means;
said rotary valve being operable in response to longitudinal movement of said third conduit within said first conduit induced by longitudinal movement of said second conduit within said first conduit; and
longitudinally spaced, mutually facing, abutment means carried by and said second and third conduits and engageable to transmit longitudinal movement of said second conduit to said third conduit.

7. An apparatus as described in claim 6:
wherein said apparatus includes hydraulic movement impeding means operably disposed between said first an second conduits and adapted to impede, without preventing, telescoping movement of said second conduit within said first conduit;
wherein said first conduit includes coupling means adapted to be connected with well apparatus for restraining movement of said first tubular member within a well bore; and
wherein said apparatus includes movement control means operable, in response to selectively but oppositely directed torque forces imposed on said second conduit, to limit longitudinal movement of said second conduit within a range sufficient to operate said slide valve means and alternatively with a range sufficient to operate both said slide valve means and said rotary valve.

8. A valving mechanism for use in a well bore, said valving mechanism comprising:
first conduit means;
second conduit means telescopingly mounted within said first conduit means and adapted to be connected with a well string extending to a well head;
third conduit means mounted for telescoping movement within said first conduit means with said second conduit means being movable relative to said third conduit means;
movement-impeding means operably disposed between said second conduit means and said first conduit means to impede, without preventing, movement of said second conduit means relative to said first conduit means;
rotary valve means carried by said third conduit means and adapting to control fluid flow therethrough; and
rotary valve operating means carried by said first and third conduit means and operable in response to telescoping movement of said third conduit means relative to said first conduit means;
said second means being disposed in telescoping engagement with said third conduit means;
abutment means carried by said second and third conduit means and engageable in response to longitudinal movement of said second conduit means with said first conduit means;
means yieldingly supporting said second conduit means so as to dispose said abutment means in axially spaced relation; and
means yieldably supporting said third conduit means within said first conduit means, said third conduit means being yieldably movable in a direction away from said second conduit means induced by engagement of said abutment means and movement of said second conduit means in the general direction of said third conduit means.

9. A mechanism as described in claim 8:
wherein said mechanism includes slide valve means carried by and operable in response to relative movement of said first and second conduit means;
wherein said mechanism includes bypass passage means extending from the interior of said third conduit means on one side of said rotary valve means to the interior of said second conduit means on the opposite side of said rotary valve means;
wherein said slide valve means is adapted to control fluid flow through said bypass passage means; and
wherein said slide valve means is operable to open said bypass passage means prior to telescoping movement of said second conduit means within said first conduit means sufficient to engage said abutment means and move said third conduit means and cause the opening of said rotary valve means.

10. A mechanism as described in claim 9:
wherein said mechanism includes a lug and slot, movement control means disposed between said first and said second conduit means, with lug means thereof being carried by one of said first and second conduit means and extending into and generally longitudinally slidable of slot means carried by the other of said first and second conduit means;
herein said slot means includes one portion adapted to limit telescoping movement of said second conduit means and prevent said second conduit means from inducing movement of said third conduit means sufficient to operate said rotary valve means; and
wherein said slot means includes a second portion connected with said first portion into which said lug means may be moved so as to permit telescoping movement of said second conduit means sufficient to induce movement of said third conduit means within said first conduit means and operate said rotary valve means.

References Cited

UNITED STATES PATENTS

| | | | |
|---|---|---|---|
| 2,703,696 | 3/1955 | Deters et al. | 251—54 |
| 2,740,479 | 4/1956 | Schwegman | 166—145 |
| 3,007,524 | 11/1961 | Pistole et al. | 166—224 |
| 3,249,124 | 5/1966 | Berryman | 166—226 X |
| 3,310,114 | 3/1967 | Dollison | 166—224 |
| 3,332,495 | 7/1967 | Young | 166—226 X |

CHARLES E. O'CONNELL, *Primary Examiner.*

IAN A. CALVERT, *Assistant Examiner.*

U.S. Cl. X.R.

251—54, 348